United States Patent

Krüger et al.

Patent Number: 5,247,036

Date of Patent: Sep. 21, 1993

[54] NON-CROSSLINKED POLYMERS, CONTAINING REACTIVE DOUBLE BONDS, OF FLUORINATED MONOMERS AND ALKENYL (ISO)-CYANURATES

[75] Inventors: Ralf Krüger; Karl-Erwin Piejko, both of Bergisch Gladbach; Gerhard Langstein, Kuerten-Biesfeld, all of Fed. Rep. of Germany

[73] Assignee: Bayer Aktiengesellschaft, Leverkusen, Fed. Rep. of Germany

[21] Appl. No.: 798,473

[22] Filed: Nov. 26, 1991

[30] Foreign Application Priority Data

Dec. 4, 1990 [DE] Fed. Rep. of Germany ....... 4038588

[51] Int. Cl.$^5$ .............................................. C08F 16/24
[52] U.S. Cl. .................. 526/255; 526/247; 526/249; 526/254; 526/261
[58] Field of Search ............... 526/247, 261, 255, 249, 526/254

[56] References Cited

U.S. PATENT DOCUMENTS

| | | | |
|---|---|---|---|
| 4,694,045 | 9/1987 | Moore | 526/247 |
| 4,931,511 | 6/1990 | Kawachi et al. | 526/247 |

FOREIGN PATENT DOCUMENTS

| | | | |
|---|---|---|---|
| 0137216 | 4/1985 | European Pat. Off. | |
| 0208314 | 1/1987 | European Pat. Off. | 526/247 |

*Primary Examiner*—Joseph L. Schofer
*Assistant Examiner*—N. Sarofim
*Attorney, Agent, or Firm*—Sprung Horn Kramer & Woods

[57] ABSTRACT

The title compounds contain one or more fluorinated monomers and alkenyl isocyanurates and/or alkenyl cyanurates of the formulae

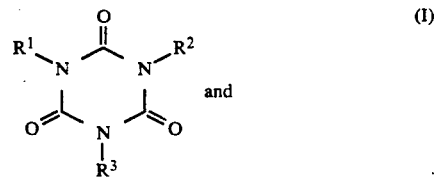

and

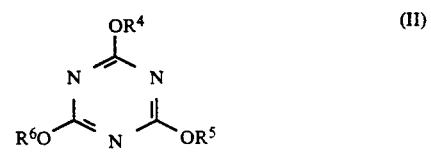

wherein
$R^1$, $R^2$, $R^4$ and $R^5$ independently of one another denote $C_3$-$C_6$-alkenyl having a terminal double bond and
$R^3$ and $R^6$ independently of one another denote $C_3$-$C_6$-alkenyl having a terminal double bond or $C_1$-$C_5$-alkyl.

The alkenyl (iso)cyanurates (I) and (II) are contained in the copolymers in an amount of 0.1–5 mol %, based on the number of moles of all the comonomers. The fluorinated monomers can also be partly replaced by comonomers which do not contain fluorine.

The title compounds can be crosslinked after shaping and can then be used as elastic or dimensionally stable shaped articles.

13 Claims, No Drawings

NON-CROSSLINKED POLYMERS, CONTAINING REACTIVE DOUBLE BONDS, OF FLUORINATED MONOMERS AND ALKENYL (ISO)-CYANURATES

BACKGROUND OF THE INVENTION

The present invention relates to fluorinated copolymers with reactive unsaturated side groups and a process for their preparation.

Fluorinated polymers are always employed in industry if particular properties are required, such as low surface tension, high resistance to chemicals or extreme requirements in respect of stability to ageing. For many intended uses, the fluorinated polymers are crosslinked during or after shaping, such as, for example, when used in the rubber field. In the case of non-modified fluorinated elastomers, that is to say which contain no particular reactive sites, these crosslinking reactions require drastic conditions, which means that the crosslinking is difficult to control and the fluorinated polymer may become damaged. To avoid this, reactive sites, so-called cure sites, at which crosslinking can be carried out selectively and under milder conditions are introduced into the polymer chains. Such cure sites are, for example, bromine substituents or iodine substituents, which are introduced into the fluorinated polymer either by copolymerising small amounts of bromine- and/or iodine-containing vinyl compounds with the fluorinated monomers (U.S. Pat. Nos. 3,351,619; 4,035,565; 4,214,060; German Offenlegungsschrift 3,715,210), or by carrying out the polymerisation in the presence of saturated compounds containing iodine or bromine and iodine (German Offenlegungsschrift 2,815,187; German Offenlegungsschrift 3,710,818). Such fluorinated polymers modified by bromine and/or iodine can be crosslinked by free radicals, for example by peroxidic compounds, in the presence of a co-crosslinking agent. Triallyl cyanurate or triallyl isocyanurate can be employed as the co-crosslinking agent (Rubber Chem. Technol. 55 (1982), 1004).

In comparison with, for example, types crosslinked with bisphenols, such fluorinated rubbers crosslinked by peroxides have a considerably improved resistance to bases, nucleophiles and oxidative attack (Kautschuk and Gummi, Kunststoffe 38 (1985), 471).

However, the fluorinated bromine- or iodine-containing polymers have the disadvantage that low molecular weight alkyl bromides or iodides which evaporate out during the crosslinking reaction and in this way impair the processing and use properties may be formed during the free radical crosslinking reaction.

There was therefore a need for fluorinated polymers which can be crosslinked by free radicals, for example by peroxide, under mild reaction conditions and which do not have the abovementioned weaknesses. These properties required could in principle be achieved by the incorporation of polyfunctional monomers, that is to say monomers with more than one reactive double bond, if controlled incorporation maintaining some of the double bond were possible.

However, if fluorinated monomers are polymerised according to the prior art in the presence of polyunsaturated monomers, such as perfluorodivinyl ether (U.S. Pat. No. 3,851,018), considerable crosslinking of the polymers already takes place during the copolymerisation in a manner which is undesirable for many purposes.

A particularly high degree of crosslinking in fluorinated polymers is even achieved by copolymerisation with hexafluorotriallyl isocyanurate (U.S. Pat. No. 4,320,216). Non-crosslinked fluorinated polymers with C—C double bonds in side chains are not accessible by known processes.

SUMMARY OF THE INVENTION

It has now been found that fluorine-containing vinyl compounds of the type mentioned below and alkenyl isocyanurates and/or alkenyl cyanurates of the type mentioned below can be copolymerised so that essentially non-cross-linked copolymers which contain reactive double bonds as side groups and can be crosslinked by free radicals under mild conditions are formed.

The invention relates to non-crosslinked copolymers, containing reactive double bonds, of a) 50–99.9 mol %, based on the number of moles of all the comonomers, of one or more ethylenes containing 1–4 fluorine atoms, b) 0–49.9 mol %, based on the number of moles of all the comonomers, of one or more comonomers from the group comprising
   b1) straight-chain or branched $C_3$–$C_8$-alkenes having at least one fluorine atom,
   b2) alkyl vinyl ethers having at least one fluorine atom,
   b3) open-chain or cyclic $C_3$–$C_6$-ketones having fluorinated $\alpha,\alpha'$-positions and
   b4) non-fluorinated $C_2$–$C_4$-alkenes, $C_3$–$C_6$-alkyl vinyl ethers and $C_4$–$C_6$-vinyl esters and c) 0.1–5 mol %, preferably 0.2–2.5 mol %, particularly preferably 0.3–1.5 mol %, based on the number of moles of all the comonomers, of one or more comonomers from the group comprising alkenyl isocyanurates and alkenyl cyanurates of the formulae

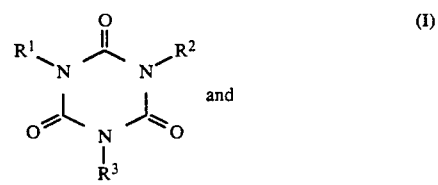

and

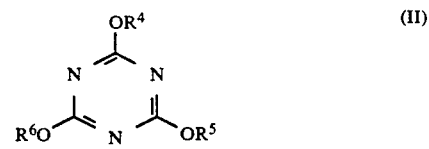

wherein
$R^1$, $R^2$, $R^4$ and $R^5$ independently of one another denote $C_3$–$C_6$-alkenyl having a terminal double bond and
$R^3$ and $R^6$ independently of one another denote $C_3$–$C_6$-alkenyl having a terminal double bond or $C_1$–$C_5$-alkyl.

The invention furthermore relates to a process for the preparation of copolymers of the type described above, which is characterised in that the abovementioned comonomers are subjected to free radical polymerisation in solution, suspension or emulsion at −15° C. to +120° C., preferably at 20°–90° C., particularly preferably at 30°–80° C., under increased pressure The copolymers according to the invention are essentially non-crosslinked. According to the invention, this means that they have gel contents of <10%, preferably <4%; the gel content is particularly preferably below the detection limit, which means that the fluorinated polymers according to the invention are completely soluble in liquids in which they are soluble at all. The gel contents are determined here by the method of M. Hoffmann et al., Polymeranalytik I und II, (Polymer analysis I and II), Georg Thieme Verlag, Stuttgart 1977. The gel contents are determined here in those solvents in which the corresponding fluorinated polymers without incorporated monomer units of the above formulae I and/or (II) are completely soluble. The copolymers according to the invention have average molecular weights of $10^3$ to $10^7$ g/mol, preferably $10^3$ to $2 \times 10^6$ g/mol. They can be built up in linear or branched form.

Ethylenes which carry 1–4 fluorine atoms are possible as constituent a) of the copolymers according to the invention. The bonds on the two carbon atoms which are not occupied by fluorine can carry hydrogen or chlorine or both. Such fluorinated ethylenes are, for example: vinylidene fluoride, tetrafluoroethylene, chlorotrifluoroethylene and vinyl fluoride Such fluorinated ethylenes can be employed either individually or as a mixture of several of them. The fluorinated ethylenes mentioned above as examples are preferably employed as constituents a).

One or more comonomers from the group comprising b1), b2), b3) and b4) are possible as constituent b). Constituents of the group b1) are straight-chain or branched $C_3$–$C_8$-alkenes which contain at least one fluorine atom. Examples of substances of group b1) are: hexafluoropropene, 2-hydro-pentafluoropropene, 3,3,3-trifluoropropene, mono- or polyfluorinated butenes, such as hexafluoroisobutylene, pentenes, hexenes or octenes. In addition to at least one fluorine atom, such substances can also carry chlorine atoms. Substances of group b1) are preferably $C_3$–$C_6$-alkenes having at least one fluorine atom, particularly preferably $C_3$–$C_4$-alkenes having at least one fluorine atom.

Substances of group b2) are alkyl vinyl ethers having at least one fluorine atom, for example perfluoropropyl perfluorovinyl ether, perfluoromethyl perfluorovinyl ether, perfluoropropyl vinyl ether and n-butyl perfluorovinyl ether.

Substances of group b3) are open chain or cyclic $C_3$–$C_6$-ketones having fluorinated $\alpha,\alpha'$-positions, which are copolymerised via the C=O bond, such as hexafluoroacetone and perfluorocyclopentanone.

Substances of group b4) are non-fluorinated $C_2$–$C_4$-alkenes, such as ethylene, propene, 1-butene, isobutylene, $C_3$–$C_6$-alkyl vinyl ethers, such as methyl vinyl ether, ethyl vinyl ether and the like, and $C_4$–$C_6$-vinyl esters, such as vinyl acetate, vinyl propionate and others.

Triesters of isocyanuric acid or of cyanuric acid or mixtures of several of these are employed as constituent c). Such esters correspond to the formulae (I) and (II) and contain at least two alkenyl ester groups having a terminal double bond. The third ester group present in each case in the formulae (I) or (II) can likewise be an alkenyl group having a terminal double bond or an alkyl group having 1–5C atoms. Such alkyl is, for example: methyl, ethyl, propyl, isopropyl, butyl, isobutyl, tert.-butyl or straight-chain or branched pentyl. $C_3$–$C_6$-alkenyl having a terminal double bond is, for example, allyl, but-3-enyl, 1-methyl-but-3-enyl or 2,2-dimethylprop-3-enyl. Those substances in which $R^1$, $R^2$ and $R^3$ or $R^4$, $R^5$ and $R^6$ are identical and have no branching on the double bond are preferably employed as constituent c). These identical substituents particularly preferably denote allyl.

In the preferred case that vinylidene fluoride, tetrafluoroethylene, chloro-trifluoroethylene and/or vinyl fluoride is possible as constituent a), other fluorine-containing ethylenes in addition to the fluorine-containing $C_3$–$C_8$-alkenes can be comonomers of constituent b1).

Constituents a), b) and c) in principle occur in the abovementioned amounts. Constituents a) and c) are obligatory constituents of the copolymers according to the invention. Their contents add up to 100 mol %. However, some of constituent a) can be replaced by one or more compounds of constituent b). The sub-groups of b), that is to say b1), b2), b3) and b4), are in principle equal here and can be represented as comonomers in the form of one compound or in the form of a mixture of several compounds from these sub-groups.

The amount of constituent c) is 0.1–5 mol %, preferably 0.2–2.5 mol %, particularly preferably 0.3–1.5 mol %. The amount of constituent a) or the sum of constituents a) and b), using the sub-groups b1), b2), b3) and/or b4), is correspondingly 95–99.9 mol %, preferably 97.5–99.8 mol %, particularly preferably 98.5–99.7 mol %. Within these last amounts stated, the amount of constituent a) is at least 50 mol %, reference always being made here, as also in the case of other data on the copolymers according to the invention, to the total number of moles of all the comonomers. The comonomers of group b) have a content of 0 to 49.9 mol %, the unsaturated compounds of sub-group b4) which do not contain fluorine preferably being employed up to a maximum content of 25 mol %. The lower limit of 0 mol % indicates that the comonomers of constituent b) are optional comonomers of the copolymers according to the invention and if appropriate are omitted completely. However, it has proved advantageous for contents of constituent b) always to be present in the copolymers when the copolymers according to the invention are used as rubbers. Possible contents for use as rubbers are 5–45 mol %, preferably 10–40 mol %, based on the number of moles of all the comonomers, which can be distributed over the various sub-groups of constituent b) and can also comprise more than one compound. Constituents b) which are preferably employed are those from sub-groups b1), b2) and/or b4). Examples which may be mentioned of combinations of constituents a) and b) for use as rubber are: vinylidene fluoride/hexafluoropropene, vinylidene fluoride/tetrafluoroethylene/hexafluoropropene, vinylidene fluoride/tetrafluoroethylene/perfluoroalkyl perfluorovinyl ether, tetrafluoroethylene/vinylidene fluoride/hexafluoropropene/pentafluoropropene, tetrafluoroethylene/vinylidene fluoride/hexafluoropropene/perfluoroalkyl perfluorovinyl ether, tetrafluoroethylene/-hexafluoropropene/-hexafluoroisobutylene and vinylidene fluoride/chlorotrifluoroethylene/hexafluoropropene.

In addition to the copolymers just described, in which comonomers of group b) are present in less than the equivalent amount, compared with group a), those copolymers in which the comonomers of group a) and b) are present in approximately the same molar amount are of importance.

In this case, the polymerisation can be steered so that the majority of the polymer chain contains strictly alternating monomers a) and b), in addition to which alkenyl (iso)cyanurates of group c) occur—according to their total amount—at greater intervals.

The composition of such copolymers according to the invention containing approximately equal molar amounts of comonomers of groups a) and b) is 50–55 mol % of group a), 44.9–49.9 mol % of group b) and 0.1–5 mol % of group c). An important example of a two-component combination of comonomers which are copolymerised in approximately the same molar amount is the combination of tetrafluoroethylene;propene, in addition to which the alkenyl (iso)cyanurate from group c) then also occurs.

The process parameters known for the copolymerisation of fluorine-containing monomers can be used for the preparation of the copolymers according to the invention; copolymerisation can be carried out in solution, suspension or emulsion (U.S. Pat. Nos. 2,968,649; 3,051,677; 3,053,818; 3,331,823; 3,335,106, with examples of possible reaction media and general reaction conditions being stated). Compounds which are known in principle and are suitable for the particular reaction medium are employed for initiation of the free radical copolymerisation. Organic, oil-soluble peroxides, which can also be fluorinated, such as benzoyl peroxide or trifluoroacetyl peroxide, or organic soluble azo compounds, such as azobisisobutyronitrile, are thus used for solution and suspension polymerisation. Water-soluble inorganic per-compounds, such as persulphates, perborates, percarbonates and the like, in general in the form of their sodium or ammonium salts, are used in the emulsion polymerisation, which is preferred for the preparation of the copolymers according to the invention. Decay accelerators, as a rule reducing agents, must additionally be employed if relatively low temperatures are used for the polymerisation, depending on the polymerisation temperature and on the decay constant of the initiator. Decay accelerators which can be used are: sulphur compounds, such as, for example, sodium sulphite, sodium pyrosulphite or Rongalite C (sodium formamidinesulphinic acid), and furthermore organic reducing agents, such as ascorbic acid, triethanolamine, metal salts, such as iron(II) or cobalt(II) salts, organometallic compounds and the like. The reaction temperatures for the copolymerisation are between $-15°$ and $+120°$ C., preferably 20° to 90° C., particularly preferably 30° to 80° C. The temperature range mentioned last provides particularly favourable conditions in respect of the space-time yield and the chemical uniformity of the copolymers.

For the preferred case of emulsion polymerisation, fluorinated emulsifiers are employed to stabilise the dispersion. Perfluroinated emulsifiers (for example water-soluble salts of $C_6$–$C_{12}$-perfluorocarboxylic acid or -sulphonic acid) are preferably employed. The sodium or ammonium salts of perfluorooctanoic acid and the lithium salt of perfluorooctanesulphonic acid may be mentioned as examples here The amounts to be employed depend on the critical micelle concentration which the emulsifier used has in the particular system. Thus, for example, the amount of lithium perfluorooctanesulphonate to be employed is between 0.3 and 1% by weight, based on the aqueous phase, while sodium perfluorooctanoate or ammonium perfluorooctanoate concentrations of between 1 and 2% by weight are necessary.

Chain transfer agents, such as methanol, isopropanol, isopentane, ethyl acetate, diethyl malonate and carbon tetrachloride, can be employed if necessary in order to adjust the molecular weight of the polymers formed.

It is another characteristic of the process according to the invention that the copolymerisation is carried out under an increased pressure This pressure must be at least 6 bar, preferably at least 10 bar, but does not need to exceed the value of 100 bar.

The copolymerisation according to the invention can be carried out batchwise, but is preferably suitable for a semi-continuous or continuous procedure.

In an advantageous variant of the process according to the invention, the stationary concentration of free monomer of constituent c), that is to say of compounds which fall under the formulae (I) and (II), is kept small. This is achieved in a batchwise or semi-continuous process by initially introducing 0.02–1.5 mol %, preferably 0.02–0.5 mol %, of compound(s) of the formula(e) (I) or (II), based on the total number of comonomers to be reacted, into the reaction vessel, if appropriate together with other reaction vessel, if appropriate together with other comonomers of constituents a) and b), and subsequently metering in the remaining amount of constituent c) uniformly according to the progress of the copolymerisation. This subsequent metering in is of course carried out while also simultaneously subsequent metering in the constituents of a) and b). The range of 0.02–1.5 mol % mentioned for monomers of the formulae (I) and/or (II) in each case represents a relative proportion of about 5–20% of constituent c), based on the total amount of 0.1–5 mol % of constituent c) to be employed. Constituent c) can be initially introduced and metered in the form of a melt of such monomers, but also as a solution in those solvents which do not interfere with the free radical copolymerisation. Such solvents are, for example, t-butanol, n-hexane and methyl acetate.

Constituents a) and if appropriate (if also used) b) are also subsequently metered in the manner described as far as possible uniformly at the rate at which they are used up, which can be effected, for example, by keeping the pressure constant. Such a procedure is particularly preferred for semi-continuous or completely continuous processes.

The copolymers according to the invention can be cross-linked by free radicals, for which the addition of co-crosslinking agents may be dispensed with if appropriate. The free radical initiation can be induced by high-energy radiation or heat in the presence of free radical initiators. The free radical initiators used are, preferably, peroxides which have decay half-lives of at least 5 minutes at temperatures above 100° C. Such initiators are, for example, dibenzoyl peroxide, bis-(tert.-butylperoxyisopropyl)-benzene or 2,5-bis-(tert.-butylperoxy)-2,5-dimethylhexane, which are employed in the customary amounts. Such a peroxide can be incorporated into the non-crosslinked copolymer according to the invention by the conventional methods of mixture formation. The copolymers according to the invention can thus be processed on a mill or in a kneader to give the mixtures mentioned, which are then vulcanised at 120° to 180° C. to give elastomers or compacted to give dimensionally stable shaped articles. Processing in solution or in the melt is also possible, it being possible for drying and cross-linking to be carried out in one step after shaping if, for example, shaped articles are produced in the form of foils, films, fibers or compact shaped articles. It is of course also possible for additional co-crosslinking agents to be incorporated. Such co-crosslinking agents which can be used are one or more compounds from the large number of known compounds having several double bonds, such as, for example, triallyl cyanurate, triallyl isocyanurate, trimethallyl isocyanurate, tetramethyltetravinyl-cyclotetrasiloxane, m-phenylene-bismaleimide and others.

The copolymers according to the invention are distinguished above all by good processing properties, such as the ability to be mixed with fillers, crosslinking auxiliaries, pigments and the like, so that it is possible to produce mixtures or blends of high homogeneity which can subsequently be crosslinked rapidly and under mild conditions to give heat-stable vulcanisates or hardened shaped articles. The degree of crosslinking and therefore the physico-mechanical properties of the crosslinking material can be varied within wide limits in a controlled manner.

A particular advantage of the copolymers according to the invention is that they contain no bromine and/or iodine and accordingly no toxic alkyl bromide and/or iodide can be released during peroxidic crosslinking.

EXAMPLES

Example 1

300 ml of deionised water were initially introduced into a 0.7 l autoclave. 4.1 g of sodium perfluorooctanoate and 1.6 g of potassium persulphate were dissolved therein. This solution was brought to a pH of about 10 with sodium hydroxide. 1.3 g of triallyl isocyanurate were then dispersed therein. The closed autoclave was subsequently charged with in each case a nitrogen pressure of 10 bar and then let down to normal pressure. This was repeated twice. 50 g of hexafluoropropene and 50 g of vinylidene fluoride were introduced into the autoclave and the reaction mixture was heated to 70° C., while stirring. When this temperature had been reached, 2.3 g of triallyl isocyanurate dissolved in 15 ml of tert.-butanol were pumped in over a period of 3.5 hours. After a total reaction time of 4.5 hours at 70° C., in which the reaction pressure dropped from 42 bar to 21 bar, the contents of the autoclave were cooled and the unreacted gas mixture was removed as waste air. The aqueous emulsion thus obtained was poured into 300 ml of a 4% strength aqueous magnesium sulphate solution for coagulation of the product. The product was washed with water and then dried, 57 g of a rubber-like copolymer being obtained. The following copolymer composition was determined from the analyses of the nitrogen and fluorine content:

vinylidene fluoride/hexafluoropropene/triallyl isocyanurate = 76.2/23.0/0.8 (molar ratio)

The copolymer is completely soluble in dimethylformamide. The intrinsic viscosity (dimethylformamide, 25° C.) is 0.5 dl/g. The presence of free double bonds can be detected by addition of iodine bromide. The HANUS iodine number is 2.0 g of iodine/100 g of polymer.

Example 2

66 g of a rubber-like copolymer were obtained by the procedure described in Example 1, but the amount of triallyl isocyanurate initially introduced into the polymerisation batch was reduced to 0.8 g and only 1.8 g of triallyl isocyanurate, dissolved in 25 ml of tert.-butanol, were pumped in over a period of 3.5 hours.

The following copolymer composition was determined by the analyses of the nitrogen and fluorine content:

vinylidene fluoride/hexafluoropropene/triallyl isocyanurate = 75.1/24.5/0.4 (molar ratio)

The copolymer is completely soluble in dimethylformamide. The intrinsic viscosity (dime(hylformamide, 25° C.) is 1.1 dl/g. The HANUS iodine number is 0.5 g of iodine/100 g of polymer.

Example 3

2,500 ml of deionised water were initially introduced into a 6 l autoclave. 9 g of lithium perfluorooctanesulphonate and 15 g of potassium peroxydisulphate were dissolved therein and 1.3 g of triallyl isocyanurate were dispersed therein. This mixture had a pH of 10.5. The closed autoclave was then charged with in each case a nitrogen pressure of 10 bar and subsequently let down to normal pressure. This was repeated twice. 300 g of hexafluoropropene and 200 g of vinylidene fluoride were introduced into the autoclave and the reaction mixture was heated to 50° C., while stirring. When this temperature had been reached, the internal pressure of the autoclave was 20 bar. The polymerisation was started by continuous addition of 10 ml per hour of an aqueous solution which contained 1.5 g of triethanolamine. During the polymerisation, a monomer mixture of 60 parts by weight of vinylidene fluoride and 40 parts by weight of hexafluoropropene was subsequently forced in so that the internal pressure of the autoclave was kept constant at 20 bar. 2.7 parts by weight of triallyl isocyanurate (dissolved in 5.4 ml of methyl acetate), based on 100 parts by weight of fluorinated monomers subsequently forced in, were forced continuously into the autoclave at the same rate. A total of 300 g of vinylidene fluoride, 200 g of hexafluoropropene and 13.5 g of triallyl isocyanurate were used up by polymerisation in this manner Within a total reaction time of 9 hours using the same weight ratios. To end the polymerisation, the contents of the autoclave were cooled and the unreacted gas mixture was removed as waste air. A coagulate-free aqueous emulsion having a solids content of 18% was obtained. A procedure analogous to the procedure described in Example 1 for isolation of the product gave 550 g of a fluorinated rubber. The molar ratio of vinylidene fluoride to hexafluoropropene in the copolymer was determined by $^{19}F$ nuclear magnetic resonance spectroscopy and the content of triallyl isocyanurate bonded to the polymer was determined by elemental nitrogen analysis. The copolymer composition is:

vinylidene fluoride/hexafluoropropene/triallyl isocyanurate = 79.9/19.7/0.4 (molar ratio).

The copolymer is soluble in dimethylformamide, dimethylacetamide and acetone; the intrinsic viscosity is 1.2 dl/g (dimethylformamide, 25° C.). The HANUS iodine number is 2.4 g of iodine/100 g of polymer.

Example 4

2,580 ml of deionised water were initially introduced into a 6 l autoclave. 34.4 g of sodium perfluorooctanoate and 12.9 g of potassium persulphate were dissolved therein. This solution was brought to a pH of about 10 with sodium hydroxide. 7.7 g of triallyl isocyanurate were then dispersed therein. The closed autoclave was subsequently charged-with in each case a nitrogen pressure of 10 bar and then let down to normal pressure. This was repeated twice. 516 g of hexafluoropropene and 516 g of vinylidene fluoride were introduced into the autoclave and the reaction mixture was heated to 70° C., while stirring. When this temperature had been reached, 31.4 g of triallyl isocyanurate dissolved in 130 ml of tert.-butanol were pumped in over a period of 4 hours, and 17.6 g of triallyl isocyanurate dissolved in 70 ml of tert.-butanol were then pumped in over a period of 3 hours. After a total reaction time of 8 hours at 70° C., during which the reaction pressure dropped from 46 bar to 33 bar, the contents of the autoclave were cooled and the unreacted gas mixture was removed as waste air. A procedure analogous to the procedure described in Example 1 for isolation of the product gave 477 g of a rubber-like copolymer.

The following copolymer composition was determined by analyses of the nitrogen and fluorine content:
vinylidene fluoride/hexafluoropropene/triallyl isocyanurate=81.7/15.4/2.9 (molar ratio)

The copolymer is soluble in dimethylformamide to the extent of 92.5%, a gel content of 7.5% by weight being found. The intrinsic viscosi(y (dime(hylformamide, 25° C.) is 1.6 dl/g. The MAMUS iodine number is 5.0 g of iodine/100 g of polymer.

Example 5

250 ml of deionised water were initially introduced into a 0.7 l autoclave. 5.0 g of sodium perfluorooctanoate and 2.0 g of potassium persulphate were dissolved therein. This solution was brought to a pH of about 10 with sodium hydroxide. 1.0 g of triallyl cyanurate were then dispersed therein. The closed autoclave was subsequently charged with in each case a nitrogen pressure of 10 bar and then let down to normal pressure. This was repeated twice. 80 g of vinylidene fluoride were introduced into the autoclave and the reaction mixture was heated to 70° C., while stirring. When this temperature had been reached, 3 g of triallyl cyanurate dissolved in 27 ml of tert.-butanol were pumped in over a period of 6 hours. After a total reaction time of 6.5 hours at 70° C., during which the reaction pressure dropped from 43 bar to 24 bar, the contents of the autoclave were cooled and the unreacted vinylidene fluoride was removed as waste air. A procedure analogous to the procedure described in Example 1 for isolation of the product gave 46 g of a copolymer. The following copolymer composition was determined by analyses of the nitrogen and fluorine content:
vinylidene fluoride/triallyl cyanurate=98.7/1.3 (molar ratio)

The copolymer is soluble in dimethylformamide to the extent of 96.2%, a gel content of 3.8% by weight being found. The intrinsic viscosity (dimethylformamide, 25° C.) is 1.1 dl/g. The HANUS iodine number is 1.3 g of iodine/100 g of polymer.

Example 6

150 ml of deionised water were initially introduced into a 0.3 l autoclave. 1.1 g of lithium perfluorooctanesulphonate and 0.8 g of potassium persulphate were dissolved therein. This solution was brought to a pH of about 10 with sodium hydroxide. 1.3 g of triallyl cyanurate were then dispersed therein. The closed autoclave was subsequently charged with in each case a nitrogen pressure of 10 bar and then let down to normal pressure. This was repeated twice. 60 g of chlorotrifluoroethylene were introduced into the autoclave and the reaction mixture was heated to 70° C., while stirring. After a total reaction time of 6.5 hours at 70° C., during which the reaction pressure dropped from 19 bar to 13 bar, the contents of the autoclave were cooled and the unreacted chlorotrifluoroethylene was removed as waste air. A procedure analogous to the procedure described in Example 1 for isolation of the product gave 43 g of a copolymer.

The following copolymer composition was determined by analyses of the chlorine and nitrogen content:
chlorotrifluoroethylene/triallyl cyanurate=97.6/2.4 (molar ratio)

The copolymer is not soluble in dimethylformamide, and a polychlorotrifluoroethylene prepared analogously and containing no triallyl cyanurate is likewise insoluble in dimethylformamide. The copolymer melts at 209° to 213° C. and has a melt viscosity of 900 Pa.s at 230° C., measured on a ball-plate rheometer at a shearing rate of 0.8 s$^{-1}$. The polychlorotrifluoroethylene prepared analogously melts at 210° to 212° C. and has a melt viscosity of 750 Pa.s at 230° C. under the same measuring conditions. The copolymer containing triallyl cyanurate is accordingly a non-crosslinking polymer.

Example 7

A mixture of 100 parts by weight of the copolymer obtained according to Example 2 with 3 parts by weight of calcium hydroxide and 5 parts by weight of bis-(t-butylperoxyisopropyl)-benzene was prepared in a kneader. This mixture was vulcanised under pressure at 180° C. for 30 minutes and after-vulcanised in a circulating air oven at 200° C. for 24 hours.

In contrast to the starting copolymer, the vulcanised product is not soluble in dimethylformamide (gel content in dimethylformamide: 92%, with a degree of swelling of 7, that is to say virtually completely cross-linked). A mixture prepared analogously from a vinylidene fluoride-hexafluoropropene copolymer which contains no polymer-bonded triallyl isocyanurate cannot be cross-linked under the conditions described.

Example 8

A mixture of 100 parts by weight of the copolymer obtained according to Example 3 with 3 parts by weight of calcium hydroxide, 30 parts by weight of the carbon black MT Black N 990, 2 parts by weight of Percalink 301-50 (triallyl isocyanurate, 50% strength in inactive fillers) and 3 parts by weight of Luperco 101 XL (2,5-dimethyl-2,5-bis(tertiarybutyl)-hexane) (45% strength in inactive fillers) was prepared on a two-roll rubber mixing mill. This mixture was vulcanised under pressure at 170° C. for 10 minutes and after-vulcanised in a circulating air oven at 200° C. for 24 hours.

The vulcanisates (100×100×1 mm sheets) produced according to Examples 7 and 8 have the following tensile strength-elongation characteristics:

| Measurement parameters | Example 7 | Example 8 |
|---|---|---|
| Tensile strength [N/mm$^2$] | 22 | 24 |
| Elongation at break [%] | 310 | 350 |
| Stress at 100% elongation [N/mm$^2$] | 9.5 | 5.9 |

Example 9

5 g of the copolymer prepared according to Example 5 were dissolved in 20 g of dimethylformamide with 1.5 g of triallyl cyanurate and 0.75 g of dibenzoyl peroxide and the solution was cast to a film 1 mm thick. The film was dried at 120° C. for 5 hours. A crosslinked film which no longer dissolved in dimethylformamide (gel content in dimethylformamide: 80%, with a degree of swelling of 5) was obtained. A polyvinylidene fluoride- or a vinylidene fluoride-hexafluoropropene copolymer film cannot be crosslinked under the conditions described.

What is claimed is:

1. A non-crosslinked copolymer, containing reactive double bonds, of
a) 50-99.9 mol %, based on the number of moles of all the comonomers, of one or more ethylenes containing 1-4 fluorine atoms,
b) 0-49.9 mol %, based on the number of moles of all the comonomers, of one or more comonomers selected from the group consisting of
b1) straight-chain or branched $C_3$-$C_8$-alkenes having at least one fluorine atom,
b2) alkyl vinyl ethers having at least one fluorine atom,
b3) open-chain or cyclic $C_3$-$C_6$-ketones having fluorinated $\alpha,\alpha'$-positions and
b4) non-fluorinated $C_2$-$C_4$-alkenes, $C_3$-$C_6$-alkyl vinyl ethers and $C_4$-$C_6$-vinyl esters and
c) 0.1-5 mol %, based on the number of moles of all the comonomers, of one or more comonomers selected from the group consisting of alkenyl isocyanurates and alkenyl cyanurates of the formulae

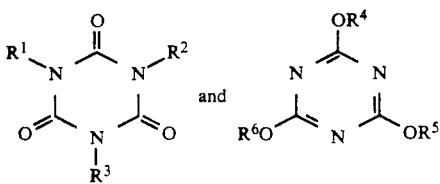

wherein
$R^1$, $R^3$, $R^4$ and $R^5$ independently of one another detone $C_3$-$C_6$-alkenyl having a terminal double bond and
$R^3$ and $R^6$ independently of one another denote $C_3$-$C_6$-alkenyl having a terminal double bond or $C_1$-$C_5$-alkyl.

2. The copolymer of claim 1, containing, as constituent c), 0.2-2.5 mol %, based on the number of moles of all the comonomers, of one of more comonomers selected from the group consisting of alkenyl isocyanurates and alkenyl cyanurates.

3. The copolymer of claim 2, containing, as constituent c), 0.3-1.5 mol %, based on the number of moles of all the comonomers, of one or more comonomers selected from the group consisting of alkenyl isocyanurates and alkenyl cyanurates.

4. The copolymer of claim 1, containing as constituent a) one or more comonomers selected from the group consisting of vinylidene fluoride, tetrafluoroethylene, chlorotrifluoroethylene and vinyl fluoride, and other fluorine-containing ethylenes can be, in addition to fluorine-containing $C_3$-$C_8$-alkenes, comonomers of constituent b1).

5. The copolymer of claim 1, wherein a combination of two or more fluorinated monomers selected from the group consisting of vinylidene fluoride/hexafluoropropene, vinylidene fluoride/tetrafluoroethylene/hexafluoropropene, tetrafluoroethylene/vinylidene fluoride/perfluoroalkyl perfluorovinyl ether, tetrafluoroethylene/vinylidene fluoride/hexafluoropropene/pentafluoropropene, tetrafluoroethylene/vinylidene fluoride/hexafluoropropene/perfluoroalkyl perfluorovinyl ether, tetrafluoroethylene/hexafluoropropene/hexafluoroisobutylene and vinylidene fluoride/chlorotrifluoroethylene/hexafluoropropene is employed.

6. The copolymer of claim 1, wherein $R^1$, $R^2$ and $R^3$ or $R^4$, $R^5$ and $R^6$ are identical.

7. The copolymer of claim 6, wherein $R^1$ to $R^6$ denote alkyl.

8. The copolymer of claim 1, containing, for use as rubber precursors, an amount of 5-45 mol %, based on the number of moles of all the comonomers, of comonomers of constituent b).

9. The copolymer of claim 8, wherein the contents of comonomers of constituent b) is 10-40 mol %.

10. The copolymer of claim 8, wherein constituent b) denotes constituents b1), b2) and/or b4).

11. The copolymer of claim 1, containing 50-55 mol % of group a), 44.9-49.9 mol % of group b) and 0.1-5 mol % of group c).

12. The copolymer of claim 1, containing as groups a) and b), the combination of tetrafluoroethylene/propene.

13. A non-crosslinked copolymer according to claim 1 that is free of bromine or iodine groups.

* * * * *